United States Patent
Liu et al.

(10) Patent No.: US 10,838,997 B2
(45) Date of Patent: Nov. 17, 2020

(54) METHOD AND DEVICE FOR GENERATING TEXT TAG

(71) Applicant: BEIJING BAIDU NETCOM SCIENCE AND TECHNOLOGY CO., LTD., Beijing (CN)

(72) Inventors: Jiachen Liu, Beijing (CN); Bolei He, Beijing (CN); Xinyan Xiao, Beijing (CN); Yajuan Lyu, Beijing (CN); Xiaoxu Fei, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 269 days.

(21) Appl. No.: 16/018,983

(22) Filed: Jun. 26, 2018

(65) Prior Publication Data
US 2019/0012377 A1    Jan. 10, 2019

(30) Foreign Application Priority Data
Jul. 5, 2017 (CN) .......................... 2017 1 0541481

(51) Int. Cl.
*G06F 16/35* (2019.01)
*G06F 17/30* (2006.01)
*G06N 99/00* (2019.01)
*G06N 20/00* (2019.01)
*G06F 16/33* (2019.01)
(Continued)

(52) U.S. Cl.
CPC .......... *G06F 16/353* (2019.01); *G06F 16/334* (2019.01); *G06F 17/30675* (2013.01); *G06F 17/30707* (2013.01); *G06N 5/003* (2013.01); *G06N 5/022* (2013.01); *G06N 20/00* (2019.01); *G06N 99/005* (2013.01)

(58) Field of Classification Search
USPC ................................... 707/738, 741
See application file for complete search history.

(56) References Cited

U.S. PATENT DOCUMENTS

2002/0022956 A1* 2/2002 Ukrainczyk .......... G06F 16/353
704/9
2004/0024739 A1* 2/2004 Copperman .......... G06F 16/353
(Continued)

FOREIGN PATENT DOCUMENTS

| CN | 101408886 | 4/2009 |
|---|---|---|
| CN | 103886034 | 6/2014 |
| CN | 104199898 | 12/2014 |

OTHER PUBLICATIONS

SIPO, First Office Action for CN Application No. 201710541481.0, dated Apr. 8, 2020.

*Primary Examiner* — Cam Linh T Nguyen
(74) *Attorney, Agent, or Firm* — Hodgson Russ LLP (57) ABSTRACT

The present disclosure provides a method and a device for generating a text tag. The method includes: performing keyword extraction using strategies corresponding to respective tag types on a target text, to obtain one or more candidate tags of the respective tag types for the target text, wherein the tag type includes at least one of an entity word, a segment text and a topic; performing reduplication removing between different tag types on the one or more candidate tags of the respective tag types to obtain one or more validated candidate tags; and determining one or more target tags of the target text based on the one or more validated candidate tags.

18 Claims, 5 Drawing Sheets

(51) Int. Cl.
*G06N 5/00* (2006.01)
*G06N 5/02* (2006.01)

(56) References Cited

U.S. PATENT DOCUMENTS

| | | | | |
|---|---|---|---|---|
| 2007/0294614 | A1* | 12/2007 | Jacquin | G06F 40/14 |
| | | | | 715/230 |
| 2008/0082607 | A1* | 4/2008 | Sastry | G06F 16/986 |
| | | | | 709/204 |
| 2008/0209320 | A1* | 8/2008 | Mawhinney | G06F 16/248 |
| | | | | 715/700 |
| 2009/0048927 | A1* | 2/2009 | Gross | G06F 16/24 |
| | | | | 705/14.42 |
| 2014/0040275 | A1* | 2/2014 | Dang | G06F 16/2228 |
| | | | | 707/741 |
| 2014/0324827 | A1* | 10/2014 | Hanses | G06F 16/38 |
| | | | | 707/722 |
| 2014/0324828 | A1* | 10/2014 | Hanses | G06F 16/9562 |
| | | | | 707/722 |
| 2014/0324829 | A1* | 10/2014 | Hanses | G06F 16/9562 |
| | | | | 707/722 |
| 2015/0019951 | A1 | 1/2015 | He et al. | |
| 2016/0034512 | A1* | 2/2016 | Singhal | G06F 16/35 |
| | | | | 707/737 |
| 2016/0259862 | A1* | 9/2016 | Navanageri | G06F 16/955 |
| 2016/0378757 | A1* | 12/2016 | Bahl | G06Q 10/101 |
| | | | | 707/728 |
| 2017/0076225 | A1* | 3/2017 | Zhang | G06Q 10/067 |
| 2017/0103072 | A1* | 4/2017 | Yuen | G06F 16/58 |
| 2017/0132229 | A1* | 5/2017 | Parihar | G06F 16/9024 |
| 2017/0185653 | A1* | 6/2017 | Huang | G06F 16/2468 |
| 2018/0285459 | A1* | 10/2018 | Soni | G06F 16/93 |

\* cited by examiner

METHOD AND DEVICE FOR GENERATING TEXT TAG

CROSS REFERENCE TO RELATED APPLICATION

This application is based on and claims a priority to Chinese Patent Application No. 201710541481.0, filed with the Status Intellectual Property Office of P. R. China on Jul. 5, 2017, the entire contents of which are incorporated herein by reference.

FIELD

The present disclosure relates to the field of artificial intelligence technologies, and more particularly to a method and a device for generating a text tag.

BACKGROUND

Tag extraction of texts (such as papers and news) refers to extracting multiple tags that can reflect content of the texts and interest of readers from the texts. The extracted tags can be taken as more refined words or segments than abstracts, which can help readers to quickly understand contents of the full text, and play an important role in classification, recommendation and association of texts.

However, in the related art, tag extraction is only based on word frequency, accuracy of extracted tags is low.

SUMMARY

Embodiments of the present disclosure provide a method for generating a text tag. The method includes: performing keyword extraction using strategies corresponding to respective tag types on a target text, to obtain one or more candidate tags of the respective tag types for the target text, in which the tag type includes at least one of an entity word, a segment text and a topic; performing reduplication removing between different tag types on the one or more candidate tags of the respective tag types to obtain one or more validated candidate tags; and determining one or more target tags of the target text based on the one or more validated candidate tags.

Embodiments of the present disclosure provide a device for generating a text tag. The device includes: an extracting module, configured to perform keyword extraction using strategies corresponding to respective tag types on a target text, to obtain one or more candidate tags of the respective tag types for the target text, in which the tag type includes at least one of an entity word, a segment text and a topic; a reduplication removing module, configured to perform reduplication removing between different tag types on the one or more candidate tags of the respective tag types to obtain one or more validated candidate tags; and a determining module, configured to determine one or more target tags of the target text based on the one or more validated candidate tags.

Embodiments of the present disclosure provide a computer device, including: a memory, a processor and computer programs stored in the memory and executable by the processor. When the processor executes the computer programs, the method for generating a text tag according to embodiments of the present disclosure is performed.

Embodiments of the present disclosure provide a non-transitory computer readable storage medium storing computer programs. When the computer programs are executed by a processor, the method for generating a text tag according to embodiments of the present disclosure is performed.

Embodiments of the present disclosure provide a computer program product including instructions. When the instructions are executed by a processor, the method for generating a text tag according to embodiments of the present disclosure is performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will now be made in detail to exemplary embodiments, examples of which are illustrated in the accompanying drawings, in which the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The method and the device for generating a text tag according to embodiments of the present invention will be described below with reference to accompanying drawings.

Figure 1:
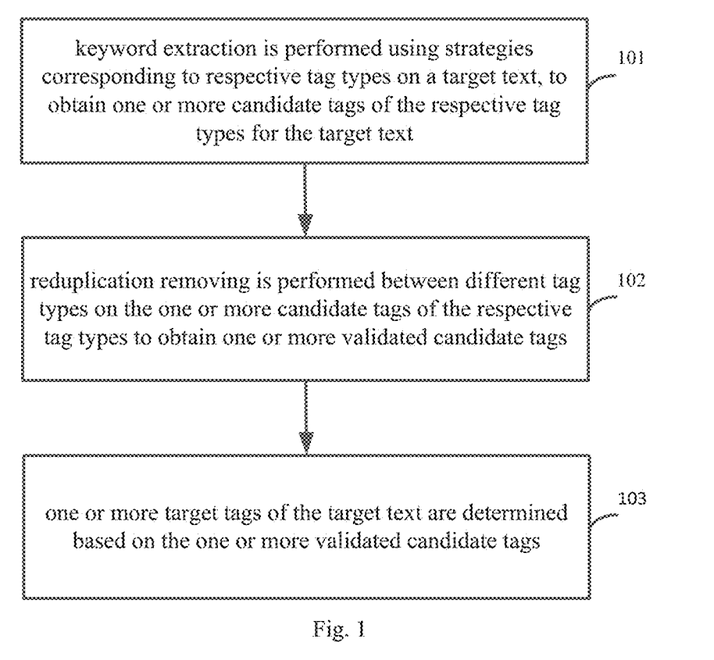
FIG. 1 is a flow chart of a method for generating a text tag according to an embodiment of the present disclosure.

FIG. 1 is a flow chart of a method for generating a text tag according to an embodiment of the present disclosure. As illustrated in FIG. 1, the method may include followings.

At block 101, keyword extraction is performed using strategies corresponding to respective tag types on a target text, to obtain one or more candidate tags of the respective tag types for the target text.

The tag type includes at least one of an entity word, a segment text and a topic.

In at least one embodiment, when the tag type is the entity word, the target text is segmented to obtain respective words, then word features of respective words are extracted, and the respective words are filtered based on the word features to obtain the one or more candidate tags of the entity word. In detail, a preset word filtering strategy is matched based on the word features to filter the respective words, and/or the word features of respective words are inputted into a pre-trained classification model to determine whether to filter out the corresponding word based on the classification result. The classification model is a pre-learned correspondence between the word features and the classification result of whether to determine as the tag.

Alternatively, in at least one embodiment, when the tag type is the segment text, the target text is segmented to obtain respective phrases, and based on words included in the respective phrases, a preset phrase filtering strategy is matched to filter the respective phrases, to obtain the one or more candidate tags of the segment text.

Alternatively, in at least one embodiment, when the tag type is the topic, one or more hot topics that match with the target text are taken as the one or more candidate tags of the topic.

At block 102, reduplication removing is performed between different tag types on the one or more candidate tags of the respective tag types to obtain one or more validated candidate tags.

In detail, based on overlapping characters between the candidate tags of different tag types, reduplication removing is performed on the one or more candidate tags, so as to retain candidate tags that match with interest points of readers.

At block 103, one or more target tags of the target text are determined based on the one or more validated candidate tags.

In detail, the one or more validated candidate tags can be sorted based on semantic importance, and the one or more target tags can be determined based on the sorting result.

In embodiments of the present disclosure, by performing keyword extraction using strategies corresponding to respective tag types on a target text, one or more candidate tags of the respective tag types for the target text are obtained, reduplication removing is performed between different tag types on the one or more candidate tags of the respective tag types to obtain one or more validated candidate tags, and one or more target tags of the target text are determined based on the one or more validated candidate tags. Since tag extraction and reduplication removing are performed on different tag types including at least one of the entity word, the segment text and the topic, accuracy of tag extraction is improved, and accuracy of tag extraction in the related art is improved.

Figure 2:
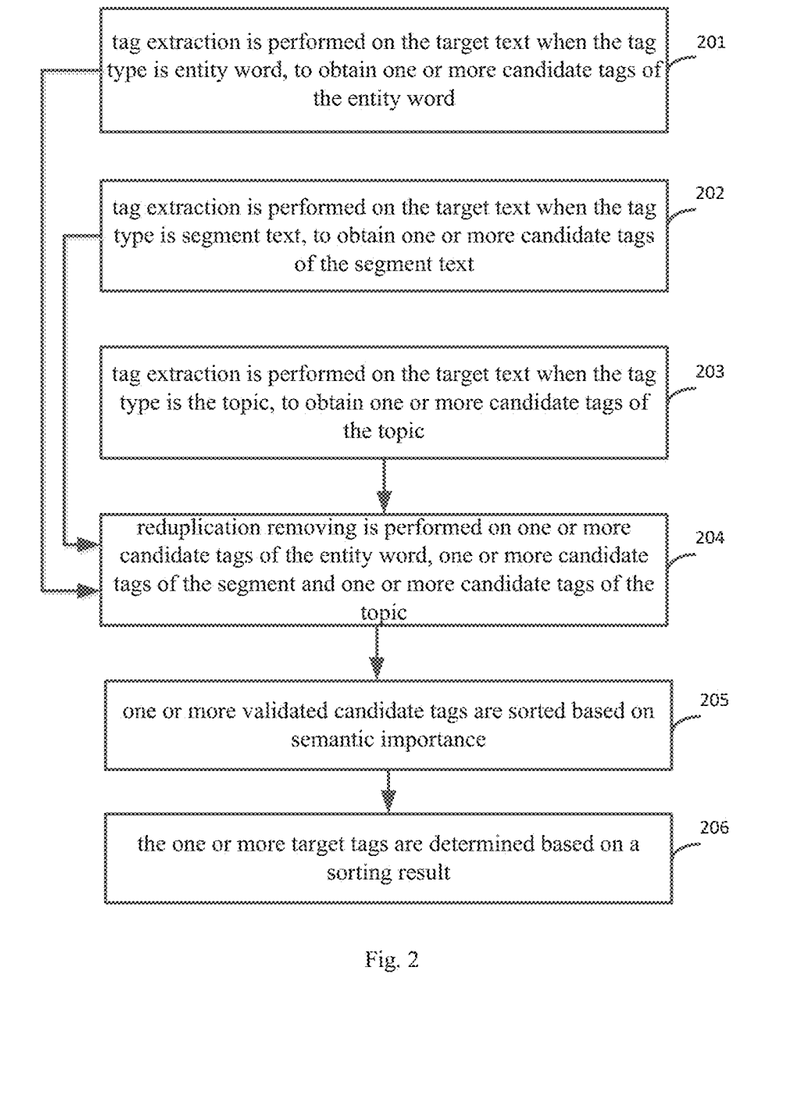
FIG. 2 is a flow chart of a method for generating a text tag according to another embodiment of the present disclosure.

To clearly illustrate the above embodiments, embodiments of the present disclosure also provide another method for generating a text tag. FIG. 2 is a flow chart of a method for generating a text tag based on another embodiment of the present disclosure. As illustrated in FIG. 2, the method may include followings.

At block 201, tag extraction is performed on the target text when the tag type is entity word, to obtain one or more candidate tags of the entity word.

In detail, entity words need to be recalled first. The title and main body of the target text are segmented to obtain respective words. After the respective words are obtained, word feature extraction is performed on the respective words. The word feature extraction includes word frequency statistics. Word features may include word frequency, part of speech (e.g., adjective, noun, etc.), named entity recognition (NER) (e.g., person's name, song title, book title, fruit, etc.), term frequency-inverse document frequency (TF-IDF), grammatical dependency (e.g., attributive, subject, object, etc.), and semantic role (such as modifier, trunk, etc.).

Then, the entity words are filtered. In detail, for respective words, a word filtering strategy is matched based on the features such as word frequency, part of speech, NER, TF-IDF, grammatical dependency and semantic role. Alternatively, word features of respective words are inputted into a classification model to determine whether to filter out the current word. Thus, words that are not suitable as tags are filtered out.

For example, the word filtering strategy may include followings.

<1> Verbs are not taken as candidate tags of the entity word.

<2> Low frequency words (word frequency is less than 3 in the full text) and idioms are not taken as candidate tags of the entity word.

<3> When a title of an article includes a person's name, person's names in the main body of the text are not taken as candidate tags of the entity word.

At block 202, tag extraction is performed on the target text when the tag type is segment text, to obtain one or more candidate tags of the segment text.

In detail, the target text is segmented to obtain respective phrases, and the respective phrases are recalled. In detail, based on the segmentation result of the title and main body of the target text, phrases including 2-5 words are recalled to obtain respective phrases. In this step, stop words are filtered out.

Then, respective phrases are filtered, and there are two ways of an internal feature way and an external resource way.

As a possible implementation, in the internal feature way, based on words included in the respective phrases, a phrase filtering strategy can be matched to filter the respective phrases, to obtain the one or more candidate tags of the segment text. The phrase filtering strategy is configured to indicate parts of speech of multiple words in the phrase, and/or whether combination of part of speech of respective words in the phrase is reasonable.

For example, the phrase filtering strategy may include followings.

<1> When a part of speech of a phrase is a type of "person's name+person's name" and the length of the phrase is greater than three words, the phrase is not taken the candidate tag of the segment text.

<2> When a phrase includes only one word of a "song" type and the length of the phrase is less than four words, the phrase is not taken the candidate tag of the segment text.

<3> When a phrase is not in pure English, the length of the phrase is greater than four words and the phrase includes only one word of a "person's name" type, the phrase is not taken the candidate tag of the segment text.

<4> When a phrase includes only one word of a "literary" type and the length of the phrase is less than three words, the phrase is not taken the candidate tag of the segment text.

As another possible implementation, filtering is performed based on external sources, and the external sources include a search log in a search engine, a knowledge graph, etc. Since the external resources include the search log in the search engine, the knowledge graph and other known phrase data, the data can be used to check whether a phrase has a clear meaning and can be taken as the tag. Examples are as followings.

<1> A Phrase having a daily search volume less than 10 in a search log is not taken as the candidate tag of the segment text.

<2> In a knowledge graph, when a probability that a phrase is a work (such as a song, a TV play, etc.) is greater than a threshold value, and the phrase is not in a part of target text enclosed by a book title mark, the phrase is not taken as the candidate tag of the segment text.

At block S203, tag extraction is performed on the target text when the tag type is the topic, to obtain one or more candidate tags of the topic.

In detail, when the tag type is the topic, one or more hot topics that match with the target text are taken as the one or more candidate tags of the topic. As a possible implementation, the hot topic can be obtained based on high-frequency search words in a recent time period.

For example, for a news article titled "A new trend of No. 18 Typhoon "Talim", the central meteorological observatory issued a typhoon blue warning at 6:00 on September 12", tags including "Typhoon", "meteorological disaster", "typhoon warning". "central meteorological observatory" and "No. 18 Typhoon Talim" are required to be extracted from the title and the content. These tags can effectively characterize the news article and reader's interest in reading the article. In the example of the news article, "No. 18 Typhoon Talim" is a hot topic in a period of time, and such topic is of great value for recommendation of news and information articles.

At block S204, reduplication removing is performed on one or more candidate tags of the entity word, one or more candidate tags of the segment and one or more candidate tags of the topic.

In detail, after the one or more candidate tags of the entity word, the one or more candidate tags of the segment and the one or more candidate tags of the topic are obtained, reduplication removing may be performed. Overlapping parts between tags are focused when reduplication removing is performed, and over-generalization is solved.

For example, "refrigerator" and "refrigerator magnet" are different interest points of readers and should not be kept in key tags at the same time.

As a possible implementation, strategies adopted in reduplication removing may include at least two of the followings.

<1> Candidate tags of the segment text include at least one candidate tag of the entity word.

Alternatively, candidate tags of the segment text do not include the candidate tag of the entity word, search volumes of candidate tags of the segment text in the search engine are greater than preset thresholds, for example, daily search volumes are greater than 300.

<2> Candidate tags of the segment text include one or more candidate tags of the entity word, and when a candidate tag of the entity word is enclosed between a quotation mark or a book title mark in the target text, the candidate tag of the segment text is filtered out.

At block S205, one or more validated candidate tags are sorted based on semantic importance.

As a possible implementation, a score is calculated based on a machine learning algorithm of Learn to Rank (LTR), for example, GBrank is a LTR algorithm based on an integrated decision tree. Training data include positive examples and negative examples. The positive examples include artificial annotated articles and keywords corresponding to the article, and the negative examples include randomly extracted non-keywords. A sorting model is trained using the positive examples and the negative examples, and an objective of the model is to give a higher score for the positive example than that for the negative example. The candidate tags are ranked from high to low based on the score.

At block S206, the one or more target tags are determined based on a sorting result.

In detail, several candidate tags ranked in front can be selected as the one or more target tags of the target text.

To clearly explain this embodiment, embodiments of the present disclosure provide an application scenario.

Figure 3:
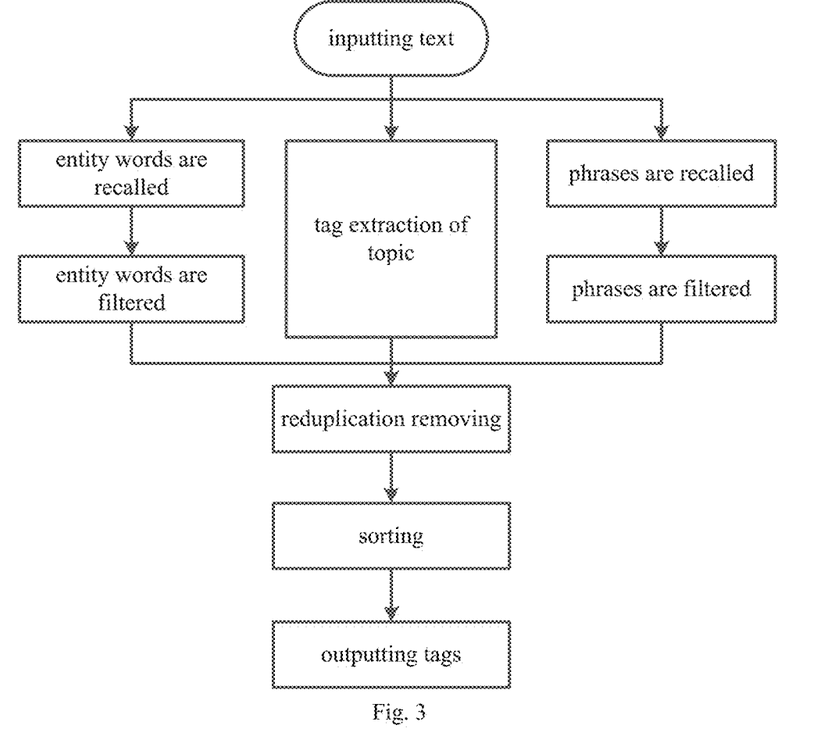
FIG. 3 a flow chart of a method for generating a tag in an application scenario according to an embodiment of the present disclosure.
Figure 4:
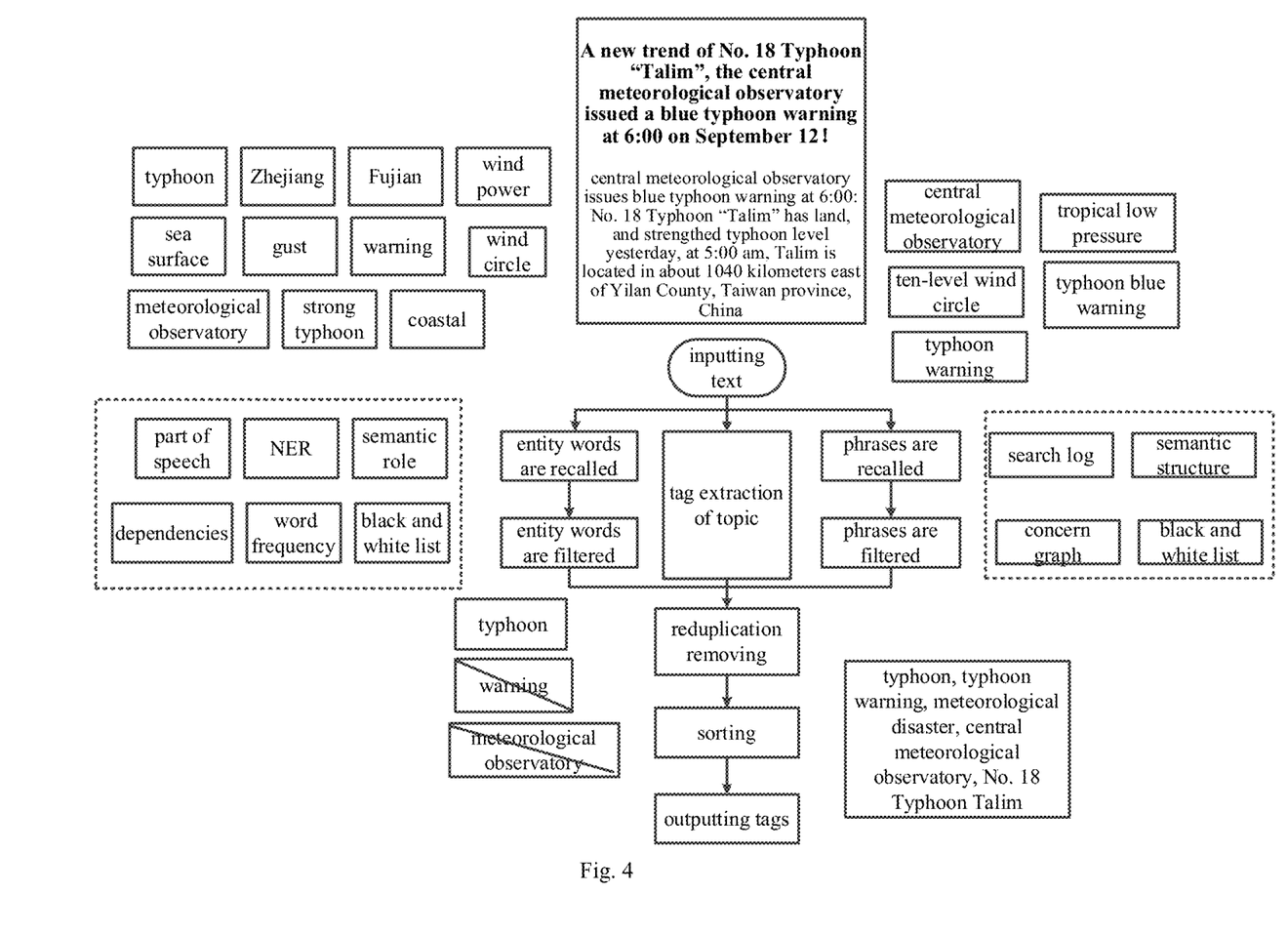
FIG. 4 is a schematic diagram of a tag generation process according to an embodiment of the present disclosure.

In the application scenario, it is required to generate one or more tags for a news article titled "A new trend of No. 18 Typhoon "Talim", the central meteorological observatory issued a typhoon blue warning at 6:00 on September 12". FIG. 3 is a flow chart of a method for generating a tag in an application scenario according to an embodiment of the present disclosure. FIG. 4 is a schematic diagram of a tag generation process according to an embodiment of the present disclosure.

As illustrated in FIG. 4, on the one hand, by recalling entity words. "typhoon", "Zhejiang", "Fujian", "wind power", "sea surface". "gust", "warning", "meteorological observatory", "wind circle". "coastal", "strong typhoon" and the like are obtained. Furthermore, filtering is performed based on features such as word frequency, part of speech, NER, TF-IDF, grammatical dependency and semantic role, and only "typhoon", "meteorological observatory" and "warning" are retained.

On the other hand, by recalling phrases, "central meteorological observatory", "tropical low pressure", "ten-level wind circle", "meteorological disaster", "typhoon warning" and the like are obtained. Furthermore, filter is performed based on the user search log, the knowledge graph, combination of part of speech of respective words in the phrase and part of speech of multiple words in the phrase, "central meteorological observatory", "meteorological disaster" and "typhoon warning" are retained.

On another hand, hot topics are recalled based on a rule, and "No. 18 Typhoon Talim" is obtained.

After three candidate tags of "typhoon", "meteorological observatory" and "warning" of the entity word, two candidate tags of "central meteorological observatory" and "typhoon warning" of the segment text and candidate tag of "No. 18 Typhoon Talim" of the hot topic are obtained, reduplication removing is performed to filter out "warning" and "meteorological observatory".

After sorting, tags illustrated in FIG. 4 are outputted.

In embodiments of the present disclosure, by performing keyword extraction using strategies corresponding to respective tag types on a target text, one or more candidate tags of the respective tag types for the target text are obtained, reduplication removing is performed between different tag types on the one or more candidate tags of the respective tag types to obtain one or more validated candidate tags, and one or more target tags of the target text are determined based on the one or more validated candidate tags. Since tag extraction and reduplication removing are performed on different tag types including at least one of the entity word, the segment text and the topic, accuracy of tag extraction is improved, and accuracy of tag extraction in the related art is improved.

In order to implement the above embodiments, the present disclosure further provides a device for generating a text tag.

Figure 5:
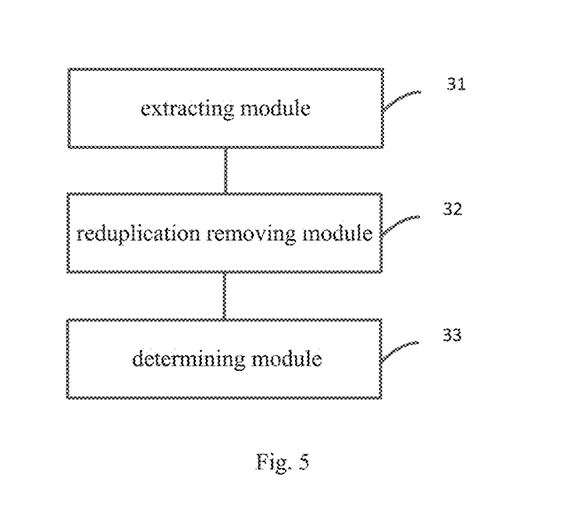
FIG. 5 is a block diagram of a device for generating a text tag according to an embodiment of the present disclosure.

FIG. 5 is a block diagram of a device for generating a text tag according to an embodiment of the present disclosure.

As illustrated in FIG. 5, the device for generating a text tag includes an extracting module 31, a reduplication removing module 32 and a determining module 33.

The extracting module 31 is configured to perform keyword extraction using strategies corresponding to respective tag types on a target text, to obtain one or more candidate tags of the respective tag types for the target text.

The tag type includes at least one of an entity word, a segment text and a topic.

In at least one embodiment, when the tag type is the entity word, the extracting module 31 is configured to segment the target text to obtain respective words, extract word features of the respective words, and filter the respective words based on the word features to obtain the one or more candidate tags of the entity word.

The extracting module 31 is configured to filter the respective words based on the word features by acts of: matching a preset word filtering strategy based on the word features, to filter the respective words; and/or inputting the word features of the respective words into a pre-trained classification model to determine whether to filter out the corresponding word based on the classification result. The classification model is a pre-learned correspondence between the word features and the classification result of whether to determine as the tag.

In at least one embodiment, when the tag type is the segment text, the extracting module 31 is configured to segment the target text to obtain respective phrases, and match a preset phrase filtering strategy to filter the respective phrases based on words included in the respective phrases, to obtain the one or more candidate tags of the segment text.

After the target text is segmented to obtain the respective phrases, the extracting module 31 is configured to query search volumes of the respective phrases based on a search log, and filter the respective phrases based on the search volumes to obtain the one or more candidate tags of the segment text; and/or query a preset knowledge graph to determine whether the respective phrases are known object names, and filter the respective phrases based on the query result to obtain the one or more candidate tags of the segment text.

In at least one embodiment, when the tag type is the topic, the extracting module 31 is configured to take one or more hot topics that match with the target text as the one or more candidate tags of the topic.

The reduplication removing module 32 is configured to perform reduplication removing between different tag types on the one or more candidate tags of the respective tag types to obtain one or more validated candidate tags.

In detail, the reduplication removing module 32 is configured to filter the one or more candidate tags based on overlapping characters between the candidate tags of different tag types, to retain the one or more candidate tags that match with interest points of readers as the one or more validated candidate tags.

The determining module 33 is configured to determine one or more target tags of the target text based on the one or more validated candidate tags.

It should be noted that, the description of embodiments of the method may be also suitable to embodiments of the device, which will not be described in detail herein.

In order to implement the above embodiments, the present disclosure further provides a computer device, including a processor, a memory configured to store instructions executable by the processor.

The processor is configured to: perform keyword extraction using strategies corresponding to respective tag types on a target text, to obtain one or more candidate tags of the respective tag types for the target text, in which the tag type includes at least one of an entity word, a segment text and a topic; perform reduplication removing between different tag types on the one or more candidate tags of the respective tag types to obtain one or more validated candidate tags; and determine one or more target tags of the target text based on the one or more validated candidate tags.

In order to achieve the above embodiments, the present disclosure also provides a non-transitory computer readable storage medium storing instructions. When the instructions in the storage medium are executed by a processor, a method for generating a text tag is performed. The method includes: performing keyword extraction using strategies corresponding to respective tag types on a target text, to obtain one or more candidate tags of the respective tag types for the target text, in which the tag type includes at least one of an entity word, a segment text and a topic; performing reduplication removing between different tag types on the one or more candidate tags of the respective tag types to obtain one or more validated candidate tags; and determining one or more target tags of the target text based on the one or more validated candidate tags.

In order to achieve the above embodiments, the present disclosure also provides a computer program product storing instructions, when the instructions in the computer program product are executed by a processor, a method for generating a text tag is performed. The method includes: performing keyword extraction using strategies corresponding to respective tag types on a target text, to obtain one or more candidate tags of the respective tag types for the target text, in which the tag type includes at least one of an entity word, a segment text and a topic; performing reduplication removing between different tag types on the one or more candidate tags of the respective tag types to obtain one or more validated candidate tags; and determining one or more target tags of the target text based on the one or more validated candidate tags.

Figure 6:
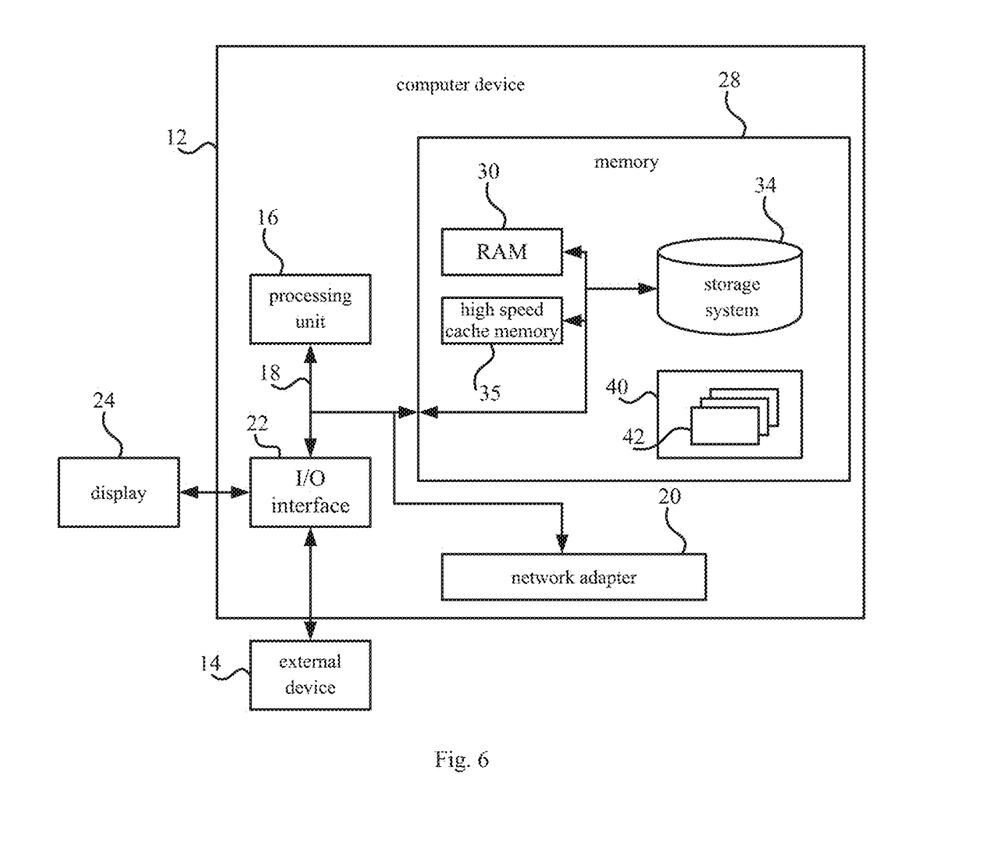
FIG. 6 is a block diagram of an exemplary computer device suitable for realizing implementations of the present disclosure.

FIG. 6 is a block diagram of an exemplary computer device suitable for realizing implementations of the present disclosure. The computer device 12 illustrated in FIG. 6 is merely an example, which should be not understood as a limitation on the functions and usage scope of embodiments of the present disclosure.

As illustrated in FIG. 6, the computer device 12 may be represented in a form of a general-purpose computing device. Components of the computer device 12 may include but are not limited to one or more processors or processing units 16, a system memory 28, a bus 18 connecting various system components including the system memory 28 and the processing units 16.

The bus 18 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 35. The computer device 12 may further include other removable or non-removable, volatile or non-volatile computer system storage medium. By way of example only, the storage system 34 may be configured to read and write a non-removable and non-volatile magnetic media (not shown in FIG. 6, commonly referred to as a "hard drive"). Although not shown in FIG. 6, a magnetic disk driver for reading from and writing to a removable and non-volatile magnetic disk (such as "floppy disk") and a disk driver for reading from and writing a removable and non-volatile optical disk (such as compact disk read only memory (hereinafter referred to as CD-ROM), Digital Video Disc Read Only Memory (hereinafter referred to as DVD-ROM) or other optical medium can be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As shown in FIG. 6, the network adapter 20 communicates with other modules of the computer device 12 over the bus 18. It should be understood that, although not shown in FIG. 6, other hardware and/or software modules may be used in conjunction with the computer device 12. The hardware and/or software includes, but is not limited to, microcode, device drivers, redundant processing units, external disk drive arrays, RAID systems, tape drive and data backup storage system.

The processing unit 16 is configured to execute various functional applications and data processing by running programs stored in the system memory 28, for example, implementing the method provided in embodiments of the present disclosure.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not construed as indicating or implying relative importance or significance. Furthermore, in the description of the present disclosure, unless specified otherwise, "'a plurality of'" means two or more than two.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for generating a text tag, comprising:
    performing keyword extraction using strategies corresponding to respective tag types on a target text, to obtain one or more candidate tags of each of the respective tag types for the target text, wherein the tag type comprises each of an entity word, a segment text and a topic;
    performing reduplication removing between different tag types on the one or more candidate tags of the respective tag types to obtain one or more validated candidate tags; and
    determining one or more target tags of the target text based on the one or more validated candidate tags;
    wherein the performing reduplication removing between different tag types on the one or more candidate tags of the respective tag types to obtain the one or more validated candidate tags, comprises: filtering the one or more candidate tags based on overlapping characters between the candidate tags of different tag types, to retain the one or more candidate tags that match with interest points of readers as the one or more validated candidate tags.

2. The method according to claim 1, wherein performing the keyword extraction using the strategies corresponding to the respective tag types on the target text, comprises:
    segmenting the target text to obtain respective words when the tag type is the entity word;
    extracting word features of the respective words; and
    filtering the respective words based on the word features, to obtain the one or more candidate tags of the entity word.

3. The method according to claim 2, wherein filtering the respective words based on the word features comprises:
    matching a preset word filtering strategy based on the word features, to filter the respective words; and/or
    inputting the word features of the respective words into a pre-trained classification model, to determine whether to filter out the corresponding word based on the classification result, wherein the classification model is a pre-learned correspondence between the word features and the classification result of whether to determine as the tag.

4. The method according to claim 1, wherein performing the keyword extraction using the strategies corresponding to the respective tag type on the target text, comprises:
    segmenting the target text to obtain respective phrases when the tag type is the segment text; and
    matching a preset phrase filtering strategy to filter the respective phrases based on words comprised in the respective phrases, to obtain the one or more candidate tags of the segment text.

5. The method according to claim 4, wherein after segmenting the target text to obtain the respective phrases, further comprises:
    querying search volumes of the respective phrases based on a search log, and filtering the respective phrases based on the search volumes to obtain the one or more candidate tags of the segment text; and/or
    querying a preset knowledge graph to determine whether the respective phrases are known object names, and filtering the respective phrases based on the query result, to obtain the one or more candidate tags of the segment text.

6. The method according to claim 1, wherein performing the keyword extraction using the strategies corresponding to the respective tag types on the target text, comprises:
    taking one or more hot topics that match with the target text as the one or more candidate tags of the topic when the tag type is the topic.

7. The method according to claim 1, wherein determining the one or more target tags of the target text based on the one or more validated candidate tags, comprises:
    sorting the one or more validated candidate tags based on semantic importance; and
    determining the one or more target tags based on a sorting result.

8. A computer device, comprising:
    a processor;
    a memory; and
    computer programs stored in the memory and executable by the processor;
    wherein when the processor executes the computer programs, a method for generating a text tag is performed, the method comprising:
    performing keyword extraction using strategies corresponding to respective tag types on a target text, to obtain one or more candidate tags of each of the respective tag types for the target text, wherein the tag type comprises each of an entity word, a segment text and a topic;
    performing reduplication removing between different tag types on the one or more candidate tags of the respective tag types to obtain one or more validated candidate tags; and
    determining one or more target tags of the target text based on the one or more validated candidate tags;
    wherein the performing reduplication removing between different tag types on the one or more candidate tags of the respective tag types to obtain the one or more validated candidate tags, comprises: filtering the one or more candidate tags based on overlapping characters between the candidate tags of different tag types, to retain the one or more candidate tags that match with interest points of readers as the one or more validated candidate tags.

9. The computer device according to claim 8, wherein performing the keyword extraction using the strategies corresponding to the respective tag types on the target text, comprises:
    segmenting the target text to obtain respective words when the tag type is the entity word;
    extracting word features of the respective words; and filtering the respective words based on the word features, to obtain the one or more candidate tags of the entity word.

10. The computer device according to claim 9, wherein filtering the respective words based on the word features comprises:
matching a preset word filtering strategy based on the word features, to filter the respective words; and/or
inputting the word features of the respective words into a pre-trained classification model, to determine whether to filter out the corresponding word based on the classification result, wherein the classification model is a pre-learned correspondence between the word features and the classification result of whether to determine as the tag.

11. The computer device according to claim 8, wherein performing the keyword extraction using the strategies corresponding to the respective tag type on the target text, comprises:
segmenting the target text to obtain respective phrases when the tag type is the segment text; and
matching a preset phrase filtering strategy to filter the respective phrases based on words comprised in the respective phrases, to obtain the one or more candidate tags of the segment text.

12. The computer device according to claim 11, wherein after segmenting the target text to obtain the respective phrases, further comprises:
querying search volumes of the respective phrases based on a search log, and filtering the respective phrases based on the search volumes to obtain the one or more candidate tags of the segment text; and/or
querying a preset knowledge graph to determine whether the respective phrases are known object names, and filtering the respective phrases based on the query result, to obtain the one or more candidate tags of the segment text.

13. The computer device according to claim 8, wherein performing the keyword extraction using the strategies corresponding to the respective tag types on the target text, comprises:
taking one or more hot topics that match with the target text as the one or more candidate tags of the topic when the tag type is the topic.

14. The computer device according to claim 8, wherein determining the one or more target tags of the target text based on the one or more validated candidate tags, comprises:
sorting the one or more validated candidate tags based on semantic importance; and
determining the one or more target tags based on a sorting result.

15. A non-transitory computer readable storage medium storing computer programs, that when the computer programs are executed by a processor, a method for generating a text tag is performed, the method comprising:
performing keyword extraction using strategies corresponding to respective tag types on a target text, to obtain one or more candidate tags of each of the respective tag types for the target text, wherein the tag type comprises each of an entity word, a segment text and a topic;
performing reduplication removing between different tag types on the one or more candidate tags of the respective tag types to obtain one or more validated candidate tags; and
determining one or more target tags of the target text based on the one or more validated candidate tags;
wherein the performing reduplication removing between different tag types on the one or more candidate tags of the respective tag types to obtain the one or more validated candidate tags, comprises: filtering the one or more candidate tags based on overlapping characters between the candidate tags of different tag types, to retain the one or more candidate tags that match with interest points of readers as the one or more validated candidate tags.

16. The non-transitory computer readable storage medium according to claim 15, wherein performing the keyword extraction using the strategies corresponding to the respective tag types on the target text, comprises:
segmenting the target text to obtain respective words when the tag type is the entity word;
extracting word features of the respective words; and
filtering the respective words based on the word features, to obtain the one or more candidate tags of the entity word.

17. The non-transitory computer readable storage medium according to claim 16, wherein filtering the respective words based on the word features comprises:
matching a preset word filtering strategy based on the word features, to filter the respective words; and/or
inputting the word features of the respective words into a pre-trained classification model, to determine whether to filter out the corresponding word based on the classification result, wherein the classification model is a pre-learned correspondence between the word features and the classification result of whether to determine as the tag.

18. The non-transitory computer readable storage medium according to claim 15, wherein performing the keyword extraction using the strategies corresponding to the respective tag type on the target text, comprises:
segmenting the target text to obtain respective phrases when the tag type is the segment text; and
matching a preset phrase filtering strategy to filter the respective phrases based on words comprised in the respective phrases, to obtain the one or more candidate tags of the segment text.

* * * * *